United States Patent
Grocutt et al.

(10) Patent No.: US 10,503,932 B2
(45) Date of Patent: Dec. 10, 2019

(54) SECURE MODE STATE DATA ACCESS TRACKING

(71) Applicant: ARM Limited, Cambridge, Cambridgeshire (GB)

(72) Inventors: Thomas Christopher Grocutt, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 167 days.

(21) Appl. No.: 15/739,825

(22) PCT Filed: May 26, 2016

(86) PCT No.: PCT/GB2016/051526
§ 371 (c)(1),
(2) Date: Dec. 26, 2017

(87) PCT Pub. No.: WO2017/009597
PCT Pub. Date: Jan. 19, 2017

(65) Prior Publication Data
US 2018/0373898 A1 Dec. 27, 2018

(30) Foreign Application Priority Data
Jul. 15, 2015 (GB) .................. 1512367.2

(51) Int. Cl.
*G06F 21/74* (2013.01)
*G06F 21/52* (2013.01)
(Continued)

(52) U.S. Cl.
CPC .......... *G06F 21/74* (2013.01); *G06F 9/44521* (2013.01); *G06F 12/1416* (2013.01); *G06F 21/52* (2013.01); *G06F 2221/2105* (2013.01)

(58) Field of Classification Search
None
See application file for complete search history.

(56) References Cited

U.S. PATENT DOCUMENTS 5,970,246 A 10/1999 Moughani et al.
6,560,698 B1 5/2003 Mann
(Continued)

OTHER PUBLICATIONS

International Search Report and Written Opinion of the ISA for PCT/GB2016/051526, dated Jul. 21, 2016, 9 pages.
(Continued)

*Primary Examiner* — Kaushikkumar M Patel
(74) *Attorney, Agent, or Firm* — Nixon & Vanderhye P.C.

(57) ABSTRACT

A data processing apparatus is provided which uses flag circuitry (174) to set an access tracking flag (SFPA) to a first value when the processing circuitry (154) enters a secure mode in association with a function call and to switch the access tracking flag to a second value upon detection of a first access of at least one type to predetermined state data, such as floating point register data, by processing circuitry operating in the secure mode in association with that function call. This access tracking flag may then be used in association with a lazy-protection program instruction (VLSTM) and a lazy-load program instruction (VLLDM) to control whether or not push operations of the state data and restore operations of the state data are performed in order to prevent access in the non-secure mode to that state data.

27 Claims, 7 Drawing Sheets

(51) Int. Cl.
*G06F 12/14* (2006.01)
*G06F 9/445* (2018.01)

(56) References Cited

U.S. PATENT DOCUMENTS

| | | | | |
|---|---|---|---|---|
| 2009/0172411 | A1* | 7/2009 | Kershaw | G06F 21/53 |
| | | | | 713/189 |
| 2009/0320048 | A1* | 12/2009 | Watt | G06F 9/4812 |
| | | | | 719/319 |
| 2011/0138464 | A1* | 6/2011 | Ohta | G06F 21/74 |
| | | | | 726/22 |
| 2012/0036341 | A1* | 2/2012 | Morfey | G06F 12/1491 |
| | | | | 712/229 |
| 2013/0205403 | A1* | 8/2013 | Grocutt | G06F 21/52 |
| | | | | 726/27 |
| 2013/0227704 | A1 | 8/2013 | Boivie et al. | |
| 2014/0123320 | A1* | 5/2014 | Isozaki | G06F 21/44 |
| | | | | 726/29 |
| 2014/0298026 | A1* | 10/2014 | Isozaki | H04L 9/0825 |
| | | | | 713/171 |
| 2014/0373171 | A1 | 12/2014 | Grocutt | |
| 2015/0371036 | A1* | 12/2015 | Warkentin | G06F 21/74 |
| | | | | 726/16 |

OTHER PUBLICATIONS

Combined Search and Examination Report for GB 1512367.2, dated Jan. 26, 2016, 5 pages.

* cited by examiner

SECURE MODE STATE DATA ACCESS TRACKING

This application is the U.S. national phase of International Application No. PCT/GB2016/051526 filed May 26, 2016, which designated the U.S. and claims priority to GB Patent Application No. 1512367.2 filed Jul. 15, 2015, the entire contents of each of which are hereby incorporated by reference.

This disclosure relates to the field of data processing systems. More particularly, this disclosure relates to data processing systems which can operate in a first security mode and in a second security mode.

It is known to provide data processing systems having a secure mode and a non-secure mode, such as processors designed by ARM Limited supporting the TrustZone architecture features. Within such systems, it is important that state data dependent upon processing performed in a secure mode should not, unless specifically desired, be accessible in the non-secure mode.

At least some embodiments of the disclosure provide apparatus for processing data comprising:
processing circuitry to operate in a first security mode and in a second security mode; and
flag circuitry to provide an access tracking flag having a first value when the processing circuitry enters the first security mode in association with a function call, wherein the processing circuitry is configured to switch said access tracking flag to a second value upon detection of a first access of at least one type to predetermined state data by the processing circuitry when operating in said first security mode in association with said function call.

At least some further embodiments of the disclosure provide a method of processing data comprising:
performing processing in one of a first security mode and in a second security mode;
providing an access tracking flag having a first value when processing circuitry enters said first security mode in association with a function call; and
switching the access tracking flag to a second value upon detection of a first access of at least one type to predetermined state data by the processing circuitry when operating in said first security mode in association with said function call.

At least some further embodiments of the disclosure provide a computer program stored on a tangible computer program storage medium in which the computer program includes at least one of a lazy-protection program instruction and/or a lazy-load program instruction.

Example embodiments will now be described, by way of example only, with reference to the accompanying drawings in which.

Figure 1:
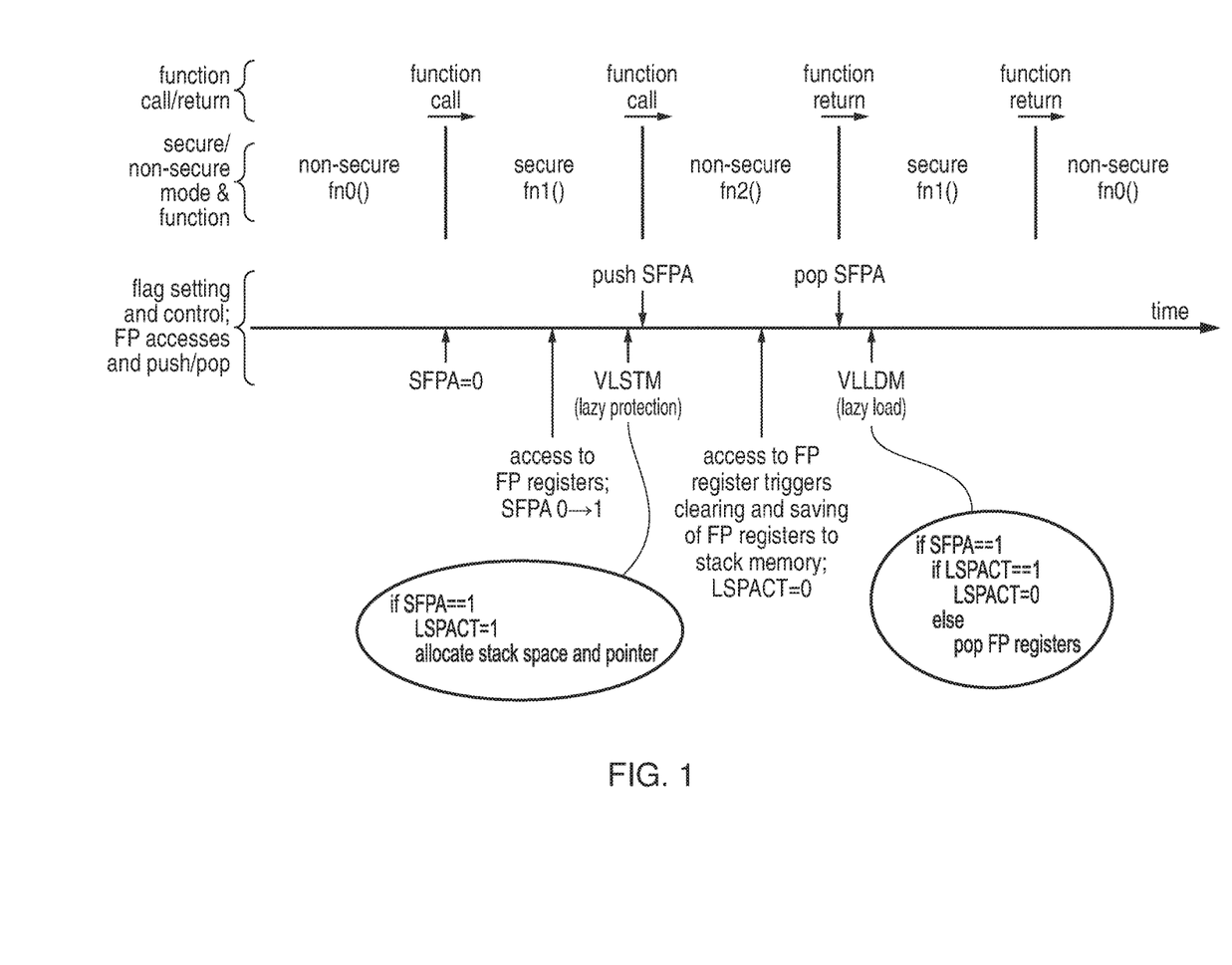
FIG. 1 schematically illustrates a sequence of function calls between non-secure processing and secure processing and associated actions to protect floating point state data dependent upon secure mode processing.

FIG. 1 schematically illustrates processing switching between a non-secure mode and a secure mode in response to function calls and function returns together with associated control of an access tracking flag and a protection flag and save and restore operations of floating point register state data to and from a stack memory. As illustrated, processing starts with a non-secure function fn0 which makes a function call to a secure function fn1. At the time this function call is made, there is a switch out of the non-secure mode and entry into a secure mode. This triggers the setting of an access tracking flag (secure floating point access flag SFPA) to a first value, e.g. "0". Thereafter processing in the secure mode using function fn1 progresses until this function fn1 makes an access to a floating point register. This is detected by flag circuitry (a flag controller) which changes the access tracking flag SFPA from the first value to a second value, e.g. "1". Subsequent accesses to the floating point registers when the access tracking flag already has the second value will leave the access tracking flag with that second value.

When the secure mode function fn1 wishes to make a function call to a non-secure function it is responsible for executing a lazy-protection program instruction VLSTM as part of its preparation for the exit from the secure mode. The execution of the lazy-protection instruction VLSTM by the processing circuitry of the processor has a number of actions. If the access tracking flag SFPA has the second value (i.e. is set at a value of "1" indicating that a floating point register access has occurred during the processing of the secure function fn1), then a protection response is prepared and a protection flag LSPACT is set to a value indicative of this protection response having been prepared. The protection response preparation includes allocating storage space within a stack memory protected from non-secure access to be used if required to store the floating point register state data. The floating point register state data is not saved out to the stack at this time, rather the space it would occupy is reserved in the stack and a pointer to that allocated space within the stack is saved.

If when the lazy-protection program instruction is executed, the access tracking flag SFPA has the first value (i.e. is set at a value of "0" indicating that the secure function fn1 has not made any floating point accesses), then there is no secure floating point state data associated with the secure function fn1 which needs protecting and accordingly no protection response is prepared and the protection flag LSPACT is not set (no space need be allocated in a secure stack memory and no pointer set). In addition to the execution of the lazy-protection program instruction VLSTM, the hardware responds to the function call switching from the secure mode to the non-secure mode by saving the value of the access tracking flag SFPA at that time for the secure function fn1 to a secure stack (e.g. stored in a memory area that is not accessible in non-secure mode) for the secure function fn1 via a push operation.

The function call from the secure function fn1 is made in the example of FIG. 1 into a non-secure function fn2. Any secure floating point state data of the secure function fn1 is initially still present within the floating point registers. Time and energy have not been consumed by default in saving off this floating point state data and clearing the floating point state data. If the non-secure function fn2 does not make any floating point accesses, then when the secure function fn1 is resumed, then the floating point state data will still be in place and further energy and time will be saved by avoiding the need to restore that floating point state data.

However, if an access to a floating point register is attempted whilst the LSPACT flag is set to "1" (e.g. by a floating point instruction executed in the non-secure function fn2), then secure state protection circuitry serves to save the floating point state data of the secure function fn1 to the allocated storage area within the secure state memory that was set up (prepared) by the lazy-protection instruction VLSTM previously executed, and then clear the floating point registers before permitting the access to the floating point registers by the non-secure function fn2. The secure state protection circuitry performs the protection response which has previously been prepared by the lazy-protection VLSTM as it detects that the protection flag LSPACT has been set (e.g. has a value of "1") indicating that the floating point registers do contain state data dependent upon processing by the secure function fn1 and that a protection response has been prepared for that floating point state data by allocating space within the secure stack and saving a pointer to that allocated space for use in the push operations saving the floating point state data of the secure function fn1.

When the protection response has been performed, the protection flag LSPACT is reset (e.g. to a value of "0") as the secure floating point state data has been saved and cleared and accordingly subsequent floating point accesses which occur during processing of the non-secure function fn2 need not trigger further protection responses for that secure floating point state data.

As illustrated in FIG. 1, the non-secure function fn2 finishes by executing a function return that returns processing to the secure function fn1. The hardware responds to this function return by restoring the access tracking flag SFPA value which was put onto the secure stack upon exit of the secure function fn1. This restoring of the access tracking flag SFPA to the resumed secure function fn1 indicates whether the preceding processing within that secure function fn1 had performed any accesses to the floating point registers and accordingly there was some secure floating point state data in existence when the function call out of the secure function fn1 was made. The secure function fn1 is responsible for executing a lazy-load instruction VLLDM as it is resumed. This has the action illustrated in pseudocode in FIG. 1. More particularly, if the access tracking flag SFPA has the second value (e.g. is set to "1"), then a determination is made as to whether the protection flag is still set (e.g. LSPACT is "1"). If the protection flag is still set, then this indicates that a protection response has not been triggered since the secure function fn1 executed the VLSTM instruction. Should this be the case, then no restore of the secure floating point state data need be made as the secure floating point state data will still be present within the floating point registers as no attempted access has been made to it during the intervening processing. The protection flag will is reset (LSPACT=0) and no further processing need be performed.

Conversely, should the access tracking flag have the second value (e.g. SFPA="1") and the protection flag not be set (e.g. LSPACT="0") when the lazy-load program instruction VLLDM is executed, then this indicates that there was secure floating point state data in place when the secure function fn1 was exited and that a protection response was triggered subsequent to executing the VLSTM and prior to execution of the VLLDM instruction. Accordingly, the VLLDM program instruction in this circumstance triggers a restore response which restores the secure floating point state data from within the secure stack (a pop) indicated by the saved pointer value as a floating point register pop operation.

In this way, it will be seen that flag circuitry provides an access tracking flag SFPA which has a first value (e.g. SFPA="0") when the processing circuitry enters the secure mode (a switch is made from the non-secure function fn0 to the secure function fn1) in association with a function call. The flag circuitry then serves to monitor access to the floating point registers occurring during the processing of the secure function fn1 and switches the access tracking flag to a second value (SFPA="0") should an access to the floating point registers occur. The accesses to the floating point registers which are tracked may take the form of any read or write access to those floating point registers. Some type of accesses may be performed without switching the value of the access tracking flag, as they do not result in the floating point state data containing any information dependent upon the secure mode processing in a way which would compromise potential security. Accordingly, the accesses which are tracked are of at least one type. The access tracking flag provided in this way permits mechanisms such as the lazy-protection and lazy-load previously described to be implemented so as to provide protection to the state data without incurring unnecessary time and energy overhead when this protection is not needed. It will be appreciated that the example of FIG. 1 has been described in connection with the state data being floating point register data. It is possible that the same mechanisms may be used to protect state data of other forms associated with secure mode processing, such as SIMD register data.

It will be appreciated by someone skilled in the art that although FIG. 1 represents a simple function call tree that this invention can be used to efficiently protect secure state in complex function call trees. Specifically the processing in the secure function fn1 might be split into several functions (potentially compiled at different times) such the compiler handling the function call to the non-secure function fn2 may not be aware of all the processing that has occurred since the entry to the secure state at the start of fn1. As a result it is often difficult or impossible for the compiler to know if the FP registers have been accessed by secure code.

Figure 2:
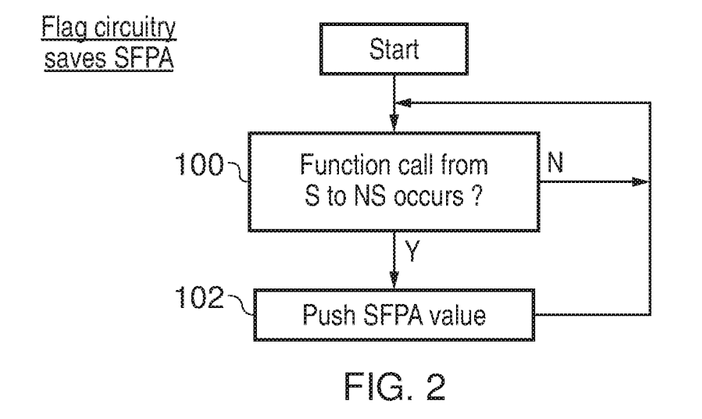
FIG. 2 is a flow diagram schematically illustrating flag circuitry saving a secure floating point access flag upon a function call from a secure mode to a non-secure mode.

FIG. 2 is a flow diagram schematically illustrating the action of the flag circuitry in saving the access tracking flag SFPA. At step 100, processing waits until a function call which is switching the system from the secure mode to the non-secure mode is detected. When such a function call is detected, processing proceeds to step 102 where the current value of the access tracking flag SFPA is saved to a secure stack memory before processing returns to step 100 to await the next secure to non-secure function call.

Figure 3:
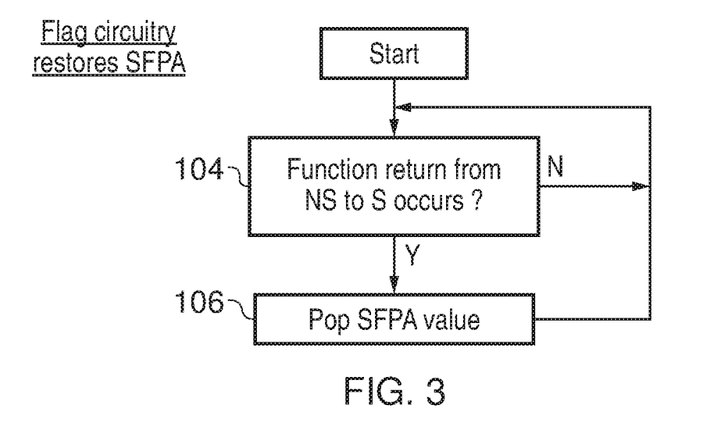
FIG. 3 is a flow diagram schematically illustrating flag circuitry restoring a secure floating point access flag upon a function return from a non-secure mode to a secure mode.

FIG. 3 is a flow diagram schematically illustrating the action of the flag circuitry in restoring the access tracking flag. At step 104 processing waits until a function return from the non-secure mode to the secure mode is detected. When such a return is detected, then step 106 serves to restore the access tracking flag SFPA from the secure stack via a pop operation.

Other example embodiments are also possible, such as embodiments in which the deallocation of the stack space is performed by a separate instruction executed after the VLLDM instruction, and VLLDM takes a register parameter that specifies the location where the floating point state may have been saved to.

Figure 4A:
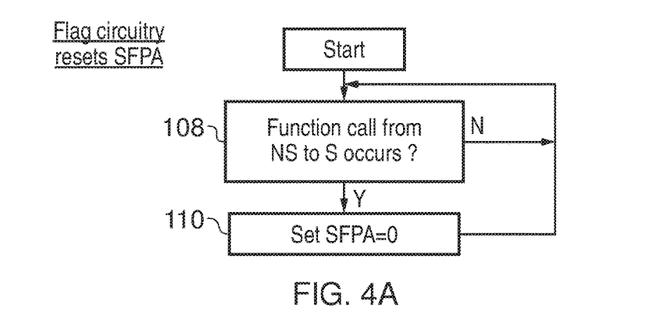
FIGS. 4A and 4B are flow diagrams schematically illustrating two example alternative ways in which a secure floating point access flag may be reset.

FIG. 4A illustrates a first example of how flag circuitry may reset the access tracking flag. At step 108 the flag circuitry waits until a function call from a non-secure mode to a secure mode is detected. When such a function call is detected, then step 110 serves to reset the access tracking flag SFPA to a first value (e.g. SFPA="0"). Processing then returns to step 108. This type of access tracking flag resetting may be used, for example, in association with a mechanism that sets the access tracking flag (e.g. SFPA="1") to the second value when either the first subsequent access to the secure floating point data occurs independently of whether the processing circuitry at that time is in the secure mode or the non-secure mode, or alternatively when a first access to the secure floating point state data occurs when the processing circuitry is operating in a secure mode. There are a variety of different ways the access tracking flag may be controlled to be set and reset. An aim of this control is that the access tracking flag has the first value upon a call into secure mode processing until a first access to the floating point state data occurs during that secure processing, whereupon the access tracking flag is set to the second value.

Figure 4B:
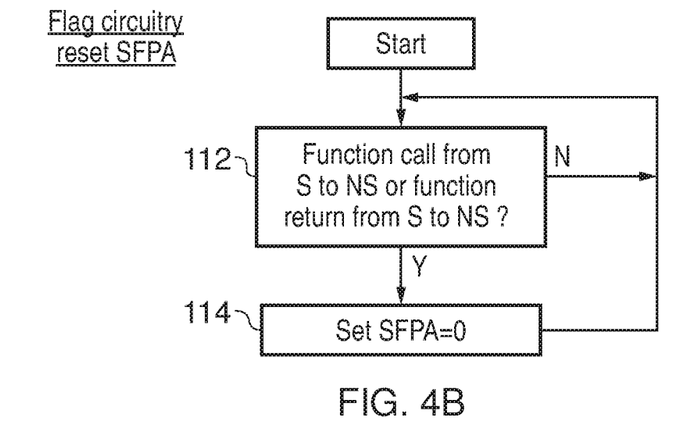

FIG. 4B is a flow-diagram illustrating a second example of how the flag circuitry may control resetting of the access tracking flag. At step 112, processing waits until a function call is made from the secure mode to the non-secure mode or a function return is made from the secure mode to the non-secure mode. When such a function call or function return is detected, then step 114 serves to set the access tracking flag to the first value (e.g. SFPA="0"). Such a resetting mechanism may be used in association with a mechanism which sets the access tracking flag upon detection of a first access to the floating point state data which occurs when the system is subsequently operating in the secure mode.

Figure 5:
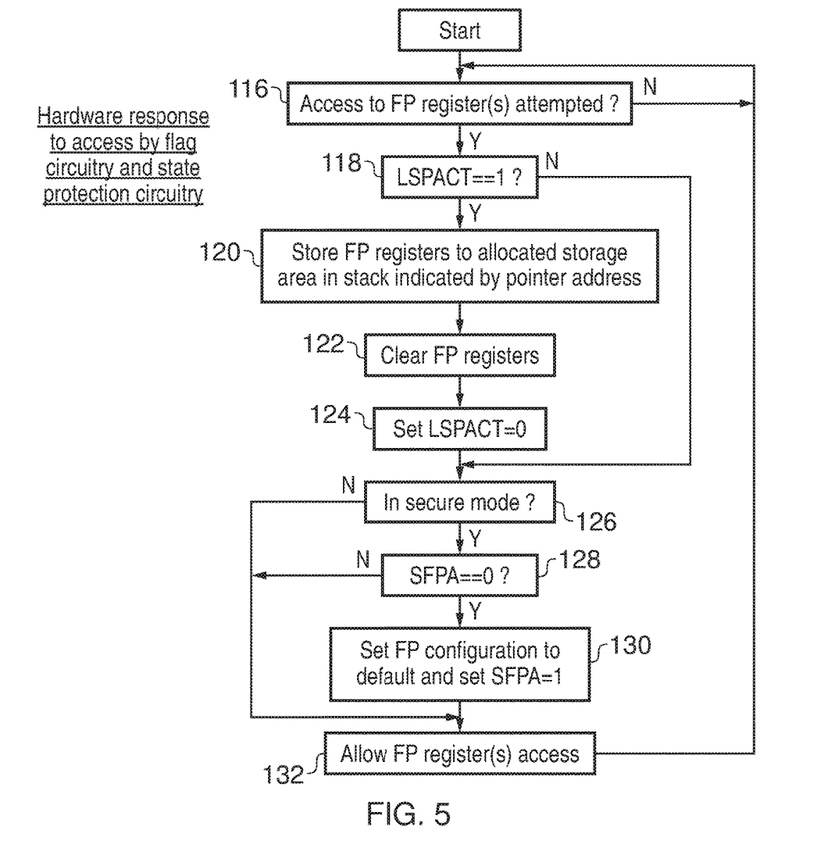
FIG. 5 is a flow diagram schematically illustrating a hardware response to a floating point access by flag circuitry and state protection circuitry.

FIG. 5 is a flow diagram schematically illustrating the hardware response (by the flag circuitry and the secure state protection circuitry) to an attempted access to floating point state data. At step 116 processing waits until an access to one or more floating point registers is attempted, i.e. an example of detecting an access of at least one type to predetermined state data by the processing circuitry. When such an attempted access is detected, then step 118 determines whether the protection flag LSPACT is currently set (e.g. LSPACT="1"). If the protection flag is set, then step 120 serves to store the current floating point register contents to the allocated storage area within the secure stack as indicated by the pointer address to that allocated storage area. The allocation of the storage area and the generation of the appropriate pointer to that allocated storage area have been previously set up (prepared) by execution of a lazy-protection program instruction as previously described.

Following step 120, step 122 serves to clear the floating point registers which have now been saved. Step 124 then serves to reset the protection flag (e.g. set LSPACT="0"). This indicates that any protection action which was prepared has now been taken and accordingly need not be repeated should a subsequent access attempt be made to secure floating point state data.

Following step 124, or if the determination at step 118 was that the protection flag was not set, processing proceeds to step 126 where a determination is made as to whether or not the processor is currently operating in the secure mode. If the processor is operating in the secure mode, then step 128 determines whether or not the access tracking flag SFPA currently has the first value (e.g. SFPA="0"). If the access tracking flag does have the first value, then this indicates that the access detected at step 116 is the first floating point access to occur during the secure mode processing and accordingly step 130 serves to set the floating point configuration (e.g. rounding modes, floating point exception handling etc.) to a default configuration as well as switching the access tracking flag to the second value (e.g. SFPA="1"). Following step 130, or following steps 126 and 128 if their determinations are negative, processing proceeds to step 132 where the floating point access attempted at step 116 is permitted. Processing then returns to step 116 is to await the next attempted floating point register access.

Figure 6:
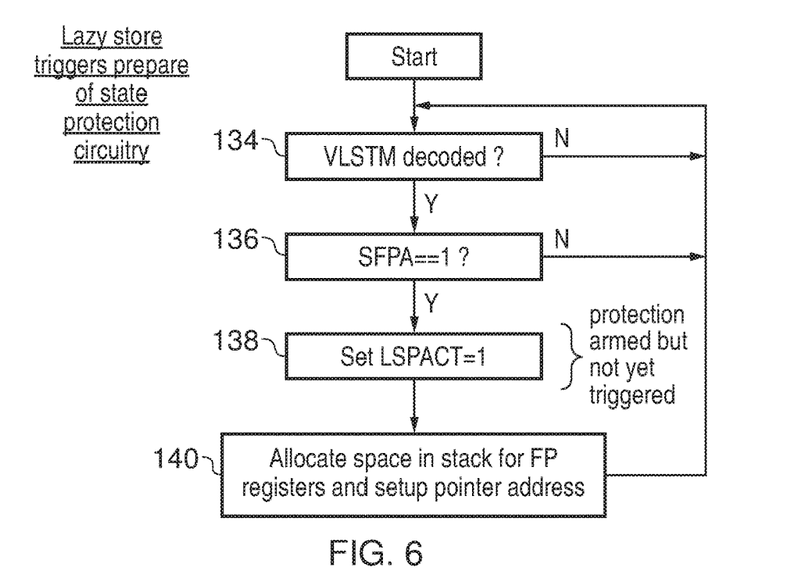
FIG. 6 is a flow-diagram schematically illustrating a lazy-protection program instruction triggering preparation of state protection circuitry.

FIG. 6 is a flow diagram schematically illustrating how execution of a lazy-store program instruction (lazy-protection program instruction) triggers preparation of the state protection circuitry to perform a protection response if required. At step 134 decoding of a lazy-store program instruction VLSTM is detected. Step 136 then determines whether or not the access tracking flag has the second value (e.g. SFPA="1"). If the access tracking flag does not have the second value, then there is no secure floating point state data which needs to be protected and accordingly no preparation need be made and processing returns to step 134. However, if the access tracking flag does have the second value, then processing proceeds to step 138 where the protection flag is set (protection is indicated as armed but not yet triggered). Step 140 then serves to allocate space in the secure stack for the floating point register state data (or other data as specified in a parameter of the VLSTM instruction) to be saved should this subsequently be detected as being necessary. Also a pointer to that allocated space within the secure stack is set up before processing returns to step 134 to await the next lazy-store program instruction.

Other example embodiments are also possible, such as embodiments in which the VLSTM instruction serves to trigger the state protection circuitry to push the secure floating point state data straight away. Another option is that a separate instruction executed prior to the VLSTM instruction serves to allocate the stack space and VLSTM takes a register parameter that specifies the location of that allocated space.

Figure 7:
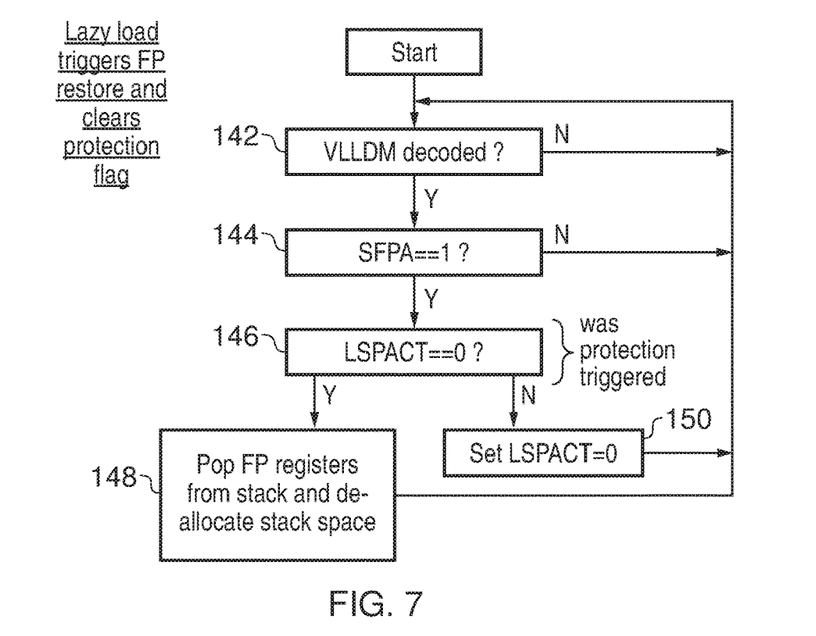
FIG. 7 is a flow diagram schematically illustrating a lazy-load program instruction triggering a floating point state data restore operation and the clearing of a protection flag.

FIG. 7 schematically illustrates the response to execution of a lazy-load program instruction. At step 142 a lazy-load program instruction (VLLDM) is decoded. Step 144 then determines whether or not the access tracking flag SFPA has the second value (e.g. SFPA="1"). If the access flag does not have the second value, then there was no secure floating point register state data for which protection was needing to be prepared and accordingly which may or may not have been subject to a push operation to the secure stack. Thus, if the access tracking flag has the first value, then processing returns from step 144 to step 142 to await the next lazy-load instruction. If the access tracking flag does have the second value as determined at step 144, then step 146 determines whether or not the protection flag is still set (e.g. LSPACT="1"). If the protection flag is not still set, then this indicates that a protection response was triggered for secure floating point state data during preceding processing and accordingly step 148 serves to perform a restore operation (pop) of the secure floating point state data to the floating point registers from the stack and deallocates the corresponding stack space. The allocated storage area is also deallocated to free up its space. If the determination at step 146 is that the protection flag is still set (e.g. LSPACT="1"), then protection was set up and prepared, but was not triggered, and accordingly a restore operation is not required and processing proceeds to step 150 where the protection flag is reset (e.g. LSPACT="0").

In some example embodiments a lazy-unprotect program instruction may be provided that when executed disables the protection response when the processing circuitry is operating in the secure mode and the protection flag is still set (e.g. LSPACT="1").

Figure 8:
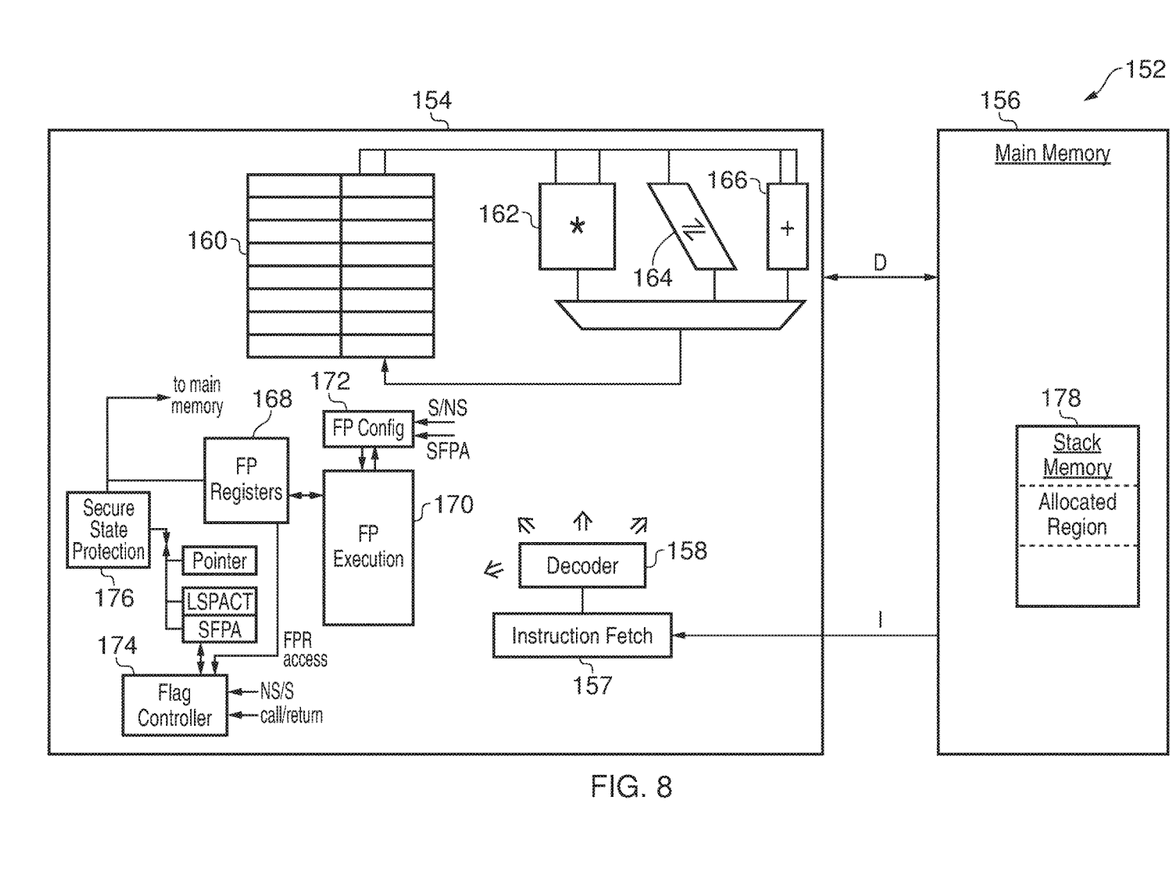
FIG. 8 schematically illustrates processing apparatus incorporating flag circuitry and state protection circuitry for supporting provision of an access tracking flag and a protection flag as part of protecting floating point state data dependent upon secure mode processing.

FIG. 8 schematically illustrates a data processing system 152 including a processor 154 connected to a main memory 156. The processor 154 retrieves program instructions and data from the main memory 156. The program instructions are fetched by an instruction fetch unit 157 and are subsequently decoded by an instruction decoder 158 that generates control signals to control the processing operations to be performed as specified by those program instructions. The processing operations performed may include, for example, integer processing operations performed using data values stored within a general purpose register bank 160 and manipulated by processing circuitry such as a multiplier 162, a shifter 164 and an adder 166. The program instructions may also include floating point program instructions which are performed upon floating point data values stored within floating point registers 168 and executed by floating point execution circuitry 170. The floating point execution circuitry 170 is configured by a floating point configuration stored within a floating point configuration register 172. This floating point configuration (e.g. rounding modes, exception behaviors, etc.) is set to a default value when first floating point access is made in the secure mode of processing. The default configuration may be hardwired or programmed in advance. The floating point configuration stored within the floating point configuration register 172 may be protected and restored at the same time as floating point state data is protected and restored as previously discussed. The floating point configuration may be part of the secure floating point state data in addition to the contents of the floating point registers themselves.

Associated with the floating point circuitry are a flag controller 174 (flag circuitry) and secure state protection circuitry 176. These circuits have the functions previously described. These circuits both maintain and respond to the access tracking flag SFPA and the protection flag LSPACT as previously described. Furthermore, storage is provided for a pointer to the area within a stack memory 178 that is allocated at runtime (within the main memory 156) to store the secure floating point state data should this be necessary.

Figure 9:
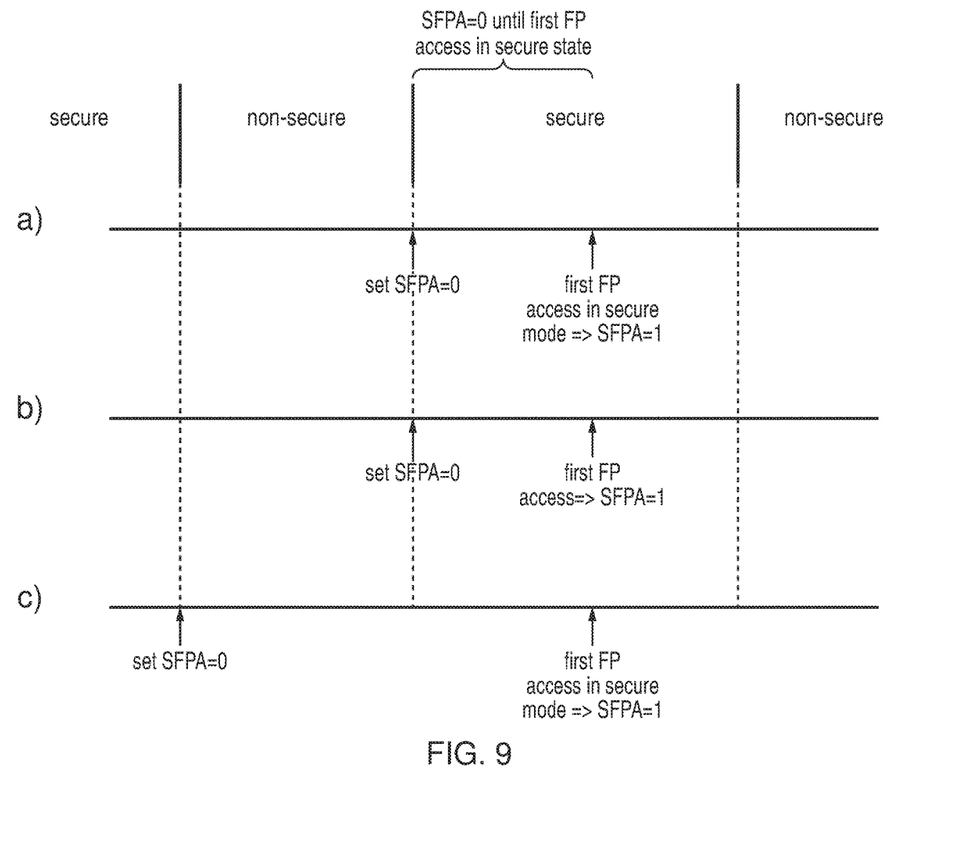
FIG. 9 schematically illustrates example alternative embodiments by which a secure floating point access flag may be reset and set in response to different triggers.

FIG. 9 schematically illustrates the operation of different embodiments and how they may serve to set the access tracking flag to a first value and set the access tracking flag to a second value. In example (a), the access tracking flag is set to the first value when a switch is made from the non-secure mode to the secure mode due to a function call. Subsequently, the access tracking flag is set to the second value when a first floating point access (of at least one type) is made whilst in the secure mode. In the example (b), the access tracking flag is again set to the first value when a switch is made from the non-secure mode to the secure mode as a function call. The access tracking flag is switched from the first value to the second value when the first subsequent floating point access occurs irrespective of whether or not the processor is in the secure mode or the non-secure mode. In the example (c), the access tracking flag is set to the first value when a switch is made from the secure mode to the non-secure mode as a function call or return. Subsequently, the access tracking flag is switched to the second value when a first floating point access is detected when the processor is operating in the secure mode. It will be seen that all of the examples (a), (b) and (c) have the effect that the access tracking flag has the first value until a first floating point access in the secure state is detected.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
processing circuitry to operate in a first security mode and in a second security mode; and
flag circuitry to provide an access tracking flag having a first value when the processing circuitry enters the first security mode in association with a function call, wherein the processing circuitry is configured to switch said access tracking flag to a second value upon detection of a first access of at least one type to predetermined state data by the processing circuitry when operating in said first security mode in association with said function call.

2. Apparatus as claimed in claim 1, wherein said flag circuitry is configured to one of:
set said access tracking flag to said first value upon entry to said first security mode and to change said access tracking flag from said first value to said second value upon detecting said first access independent of whether said processing circuitry is operating in said first security mode or in said second security mode;
set said access tracking flag to said first value upon entry to said first security mode and to change said access tracking flag to said second value upon detecting said first access and that said processing circuitry is operating in said first security mode; and
set said access tracking flag to said first value upon entry to said second security mode and to change said access tracking flag to said second value upon detecting said first access and that said processing circuitry is operating in said first security mode.

3. Apparatus as claimed in claim 1, wherein said flag circuitry is responsive to a further function call that switches said processing circuitry from operating in said first security mode to operating in said second security mode to save a current value of said access tracking flag to an access tracking flag data store.

4. Apparatus as claimed in claim 3, wherein said flag circuitry is responsive to a function return from said further function call that switches said processing circuitry from operating in said second security mode to operating in said first security mode to restore said access tracking flag to said current value from said access tracking flag data store.

5. Apparatus as claimed in claim 3, wherein said access tracking flag data store is a stack memory.

6. Apparatus as claimed in claim 1, comprising
secure state protection circuitry to trigger a protection response in respect of said predetermined state data when at least:
said processing circuitry is operating in said second security mode;
said access tracking flag had said second value when operating in said first security mode before switching to said second security mode in association with a function call; and
said processing circuitry attempts to access said predetermined state data, wherein
said protection response comprises clearing a first subset of said predetermined state data.

7. Apparatus as claimed in claim 6, wherein protection response comprises saving a second subset of said predetermined state data to a state data store.

8. Apparatus as claimed in claim 6, wherein said processing circuitry is responsive to execution of a lazy-protection program instruction to prepare said state protection circuitry to perform said protection response should said processing circuitry attempt to access said first subset of said predetermined state data when one of:
said access tracking flag has said second value; and
said lazy-protection program instruction is executed.

9. Apparatus as claimed in claim 6, wherein said protection response comprises setting a protection flag to a value indicative of triggering of said protection response.

10. Apparatus as claimed in claim 9, wherein said protection flag is one of:
a dedicated protection flag; and
said access tracking flag.

11. Apparatus as claimed in claim 8, wherein said execution of said lazy-protection program instruction triggers said protection response.

12. Apparatus as claimed in claim 7, wherein said processing circuitry is responsive to execution of a lazy-load program instruction to load said second subset of said predetermined state data from said state data store when:
said processing circuitry is operating in said first security mode; and
said protection flag has said value indicative of triggering of said protection response.

13. Apparatus as claimed in claim 12, wherein said load of said second subset of said predetermined state data is further dependent upon said access tracking flag having said second value.

14. Apparatus as claimed in claim 8, wherein said processing circuitry is responsive to execution of said lazy-load program instruction to clear said preparing of said secure state protection circuitry when:
said processing circuitry is operating in said first security mode; and
said protection flag has a value other than indicative of triggering of said protection response.

15. Apparatus as claimed in claim 9, wherein said processing circuitry is responsive to execution of a lazy-unprotect program instruction to disable said protection response when:
said processing circuitry is operating in said first security mode; and
said protection flag has a value other than indicative of triggering of said protection response.

16. Apparatus as claimed in claim 1, comprising a floating point register file storing floating point values, wherein said predetermined state data includes said floating point values.

17. Apparatus as claimed in claim 16, wherein said access by said processing circuitry to said floating point values comprises execution of a floating point instruction.

18. Apparatus as claimed in claim 16, wherein floating point configuration data specifies one or more parameters associated with performing floating point processing operations by said processing circuitry and upon executing said floating point instruction in said secure state when said access tracking flag has said first value said floating point configuration data is set to default floating point configuration data.

19. Apparatus as claimed in claim 7, wherein said state data store comprises a stack memory.

20. Apparatus as claimed in claim 7, wherein said state protection circuitry is prepared to perform said saving by allocating a storage area within said stack memory to store said second subset of said predetermined state data and providing a pointer address for said storage area to said state protection circuitry.

21. Apparatus as claimed in claim 20, wherein said lazy-protection program instruction has a parameter specifying what state data of said apparatus comprises said first subset of said predetermined state data.

22. Apparatus as claimed in claim 12, wherein processing circuitry is responsive to execution of said lazy-load program instruction to deallocate said storage area within said stack memory when one of:
said lazy-load program instruction loads said predetermined state data from said stack memory;
said lazy-load program instruction clears said preparing of said state protection circuitry; and
said lazy-load program instruction is executed.

23. Apparatus as claimed in claim 12, wherein said lazy-load program instruction has a parameter specifying what state data of said apparatus comprises said second subset of said predetermined state data.

24. Apparatus as claimed in claim 1, wherein said first security mode is more secure than said second security mode.

25. A method of processing data comprising:
performing processing in one of a first security mode and in a second security mode;
providing an access tracking flag having a first value when processing circuitry enters said first security mode in association with a function call; and
switching the access tracking flag to a second value upon detection of a first access of at least one type to predetermined state data by the processing circuitry when operating in said first security mode in association with said function call.

26. A computer program stored on a non-transitory, computer program storage medium to control operation of an apparatus as claimed in claim 1, said computer program including a lazy-protection program instruction executable when operating in said first security mode to prepare state protection circuitry to perform a protection response in respect of said predetermined state data should said processing circuitry attempt to access a first subset of said predetermined state data when operating in said second security mode.

27. A computer program stored on a non-transitory, computer program storage medium to control operation of an apparatus as claimed in claim 12, said computer program including said computer program including a lazy-load program instruction executable to control said processing circuitry to load said second subset of said predetermined state data from said state data store when:

said processing circuitry is operating in said first security mode; and said protection flag has said value indicative of triggering of said protection response.

\* \* \* \* \*